United States Patent
Ukai et al.

(10) Patent No.: US 6,835,485 B2
(45) Date of Patent: Dec. 28, 2004

(54) SOLID OXIDE FUEL CELL HAVING A SUPPORTED ELECTROLYTE FILM

(75) Inventors: Kenji Ukai, Tokai (JP); Yasunobu Mizutani, Tokai (JP)

(73) Assignee: Toho Gas Co., Ltd., Nagoya (JP)

( * ) Notice: Subject to any disclaimer, the term of this patent is extended or adjusted under 35 U.S.C. 154(b) by 286 days.

(21) Appl. No.: 09/983,056

(22) Filed: Oct. 23, 2001

(65) Prior Publication Data

US 2002/0048701 A1 Apr. 25, 2002

(30) Foreign Application Priority Data

Oct. 23, 2000 (JP) ........................................ 2000-322671

(51) Int. Cl.$^7$ .............................. H01M 4/90; H01M 8/10
(52) U.S. Cl. ............................... 429/33; 429/41; 429/44
(58) Field of Search .............................. 429/30, 33, 40, 429/41, 44

(56) References Cited

U.S. PATENT DOCUMENTS

| | | | | |
|---|---|---|---|---|
| 5,261,944 A | * | 11/1993 | Lockhart et al. | 75/628 |
| 5,908,713 A | * | 6/1999 | Ruka et al. | 429/31 |
| 5,942,349 A | * | 8/1999 | Badwal et al. | 429/34 |
| 6,428,920 B1 | * | 8/2002 | Badding et al. | 429/30 |

FOREIGN PATENT DOCUMENTS

| | | |
|---|---|---|
| DE | 198 42 265 | 4/1999 |
| EP | 1 026 134 | 8/2000 |

OTHER PUBLICATIONS

H.P. Buchkremer et al., "Advances in the Anode Supported Planar SOFC Technology," *Proc. 5$^{th}$ Intl. Symp on Solid Oxide Fuel Cells (SOFC–V)*, vol. 97, No. 18*, pp. 160–170, The Electrochemical Society, Inc. (1997), no month.

K. Murata et al., "Fabrication and Evaluation of Electrode-Supported Planar SOFC." *Denki Kagaku (Electrochemistry)*, vol. 65, No. 1, pp. 38–43 (1997), no month.

D. Ghosh et al, "Performance of Anode Supported Planar SOFC Cells," *Proc. 6$^{th}$ Intl. Symp. on Solid Oxide Fuel Cells (SOFC–VI)*, vol. 99, No. 19, pp. 822–829, The Electrochemical Society, Inc. (1999), no month.

D. Stöver et al., "Recent Developments in Anode Supported Thin Film SOFC at Research Centre Jülich," *Proc. 6$^{th}$ Intl. Symp. on Solid Oxide Fuel Cells (SOFC–VI)*, vol. 99, No. 19, pp. 812–821. The Electrochemical Society, Inc. (1999), no month.

S. Primdahl et al., "Thin Anode Supported SOFC," *Proc. 6$^{th}$ Intl. Symp. on Solid Oxide Fuel Cells (SOFC–VI)*, vol. 99, No. 19, pp. 793–802, The Electrochemical Society, Inc. (1999), no month.

* cited by examiner

*Primary Examiner*—Patrick Ryan
*Assistant Examiner*—Tracy Dove
(74) *Attorney, Agent, or Firm*—Finnegan, Henderson, Farabow, Garrett & Dunner, LLP

(57) ABSTRACT

The present invention intends to provide a solid oxide fuel cell having a supported electrolyte film, which shows sufficiently high reliability, yields a high output, and exhibits high output power density per unit volume. The present invention is characterized by use of a first cermet comprising catalyst and a second solid electrolyte, which has a bending strength of more than 500 MPa and exhibits oxide ion conductivity, for a fuel electrode substrate in an SOFC having a supported electrolyte film equipped with an electrolyte-electrode assembly that is made by bonding the fuel electrode substrate and an air electrode on both sides of an electrolyte film consisting of the first solid electrolyte capable of exhibiting oxide ion conductivity. As a preferred embodiment, stabilized zirconia containing 2 to 4 mol % yttria or 3 to 6 mol % scandia is preferred for the second solid electrolyte. More particularly, an interlayer comprising the second catalyst and the third solid electrolyte, which shows oxide ion conductivity of more than 0.1 S/cm at 800° C., is preferably interposed between the electrolyte film and the fuel electrode substrate.

13 Claims, 3 Drawing Sheets

SOLID OXIDE FUEL CELL HAVING A SUPPORTED ELECTROLYTE FILM

BACKGROUND OF THE INVENTION

1. Field of the Invention

The present invention relates to a solid oxide fuel cell, more particularly relates to a solid oxide fuel cell having a supported electrolyte film suitable for distributed power sources or cogeneration systems in cities, and fuel cells used in automobiles.

2. Description of Related Art

The solid oxide fuel cell (referred to as SOFC hereinafter) is a fuel cell that employs oxide ion-conductive solid electrolytes as the electrolyte. Its structure is roughly classified into a cylindrical type, a planar type, and a monoblock layer type. Among them, the planar type exhibits high efficiency in power generation due to its relatively low internal resistance as well as high power densities per unit volume deriving from its laminated structure comprised of multiple thin cells.

The planar type SOFC is further divided into a self-supporting electrolyte film type and a supported electrolyte film type. In FIG. 5A is shown a schematic block diagram for an SOFC of self-supporting electrolyte film type. In the figure, an SOFC 10 having a self-supporting electrolyte film has a structure, in which a thin fuel electrode 14 and an air electrode 16 are bonded to both sides of a self-supporting electrolyte film 12 having a thickness of 300 to 500 $\mu$m to form an electrolyte-electrode assembly 18, and the electrolyte-electrode assembly 18 is interposed between two gas separators 20, 20.

As the operating temperature of the SOFC 10 having a self-supporting electrolyte film is generally about 1,000° C., reactions in a cell proceed rapidly. It also allows internal reforming, and facilitates minimization and efficiency improvement for the cell. In addition, there have been many research reports on the SOFC having a self-supporting electrolyte film and its reliability and durability has been proved.

The SOFC 10 having a self-supporting electrolyte film, however, requires a rather long time period for elevating temperature to its operating range. Expensive heat-resistant materials are needed for the surrounding parts of the SOFC 10, and its gas sealing is also difficult to deal with. In order to avoid these problems, operating temperature of the SOFC 10 should be lowered. But simple lowering of the operating temperature leads to increasing resistance in the electrolyte film 12, which does not induce higher outputs. This is because the conductivity of oxide ion-conductive solid electrolytes generally depends on the temperature, and decreases as the temperature decreases.

On the other hand, an SOFC 30 having a supported electrolyte film, as shown in FIG. 5B, comprises a structure, in which a very thin electrolyte film 32 is supported by a thick fuel electrode 34 (referred to as fuel electrode substrate hereinafter), and a thin air electrode 8 is bonded to the other surface of the electrolyte film 32 forming an electrolyte-electrode assembly 38, and the electrolyte-electrode assembly 38 is interposed between two gas separators 40, 40.

As the resistance of the electrolyte film 32 is proportional to its specific resistance and thickness, the total resistance of the electrolyte film 32 can be lowered by thinning its thickness even if the specific resistance of the electrolyte film 32 is increased. For this reason, the operating temperature for the SOFC 30 having a supported electrolyte film can be lowered to 700 to 850° C. without diminishing its outputs. In addition, inexpensive materials such as stainless steel can be used for the surrounding parts resulting in cost down of the SOFC 30. Further compression of temperature-raising time and facile gas sealing may be accomplished so that the utility and durability of the SOFC 30 are improved more.

In the fuel electrode substrate 34 for the SOFC 30 having a supported electrolyte film, a cermet comprising nickel and yttria-stabilized zirconia (referred to as 8YSZ hereinafter), which has a composition of $ZrO_2$ containing 8 mol % $Y_2O_3$, is employed. 8YSZ is also commonly used for the electrolyte film 32. (For example, refer to "SOLID OXIDE FUEL CELL VI", S. C. Singhal, M. Dokiya (ed.), p822–p829. )

The fuel electrode substrate works to donate and accept electrons, at the same time supplies fuel gas nearby the electrolyte film, and discharges reacted products out of the system. It is comprised of porous materials having the gas permeability. 8YSZ itself is a material having rather small mechanical strength. Therefore, the conventional SOFC having a supported electrolyte film using Ni-8YSZ as the fuel electrode substrate has been accompanied with a problem that the electric cell easily cracks and thus has a low reliability.

On the other hand, the reliability of an SOFC having a supported electrolyte film using Ni-8YSZ has been improved using a thicker fuel electrode substrate as its mechanical strength is reinforced. But the thicker substrate causes inferior gas permeability resulting in lowered outputs of an SOFC. In the case of a planar SOFC, multiple cells are generally employed in laminated stack. Thus a thicker fuel electrode substrate increases a necessary amount of raw materials, and material costs and thickness of the stack in total, and decreases output density per unit volume.

In order to improve outputs of an SOFC having a supported electrolyte film, it is essential to lower the resistance of the electrolyte film. On the other hand, the oxide ion conductivity of a solid electrolyte is generally determined by its composition. Therefore, in order to lower the resistance of the electrolyte film at low temperatures retaining conventional 8YSZ, the thickness of electrolyte film must be further decreased. However, the electrolyte film is needed of a separator function for isolating reaction gases. A thinner electrolyte film yields difficulties in retaining its gastight quality. So there are certain limits for raising outputs of the SOFC having a supported electrolyte film by thinning the electrolyte film.

SUMMARY OF THE INVENTION

The present invention has been made in view of the above circumstances and has an object to overcome the above problems and to provide an SOFC having a supported electrolyte film, which is exceedingly reliable, yielding high outputs, and exhibiting high output densities per unit volume.

To achieve the objects and in accordance with the purpose of the present invention, as embodied and broadly described herein, a solid oxide fuel cell having a supported electrolyte film comprises an electrolyte film comprised of a first solid electrolyte exhibiting oxide ion conductivity, a fuel electrode substrate which is bonded to a surface of the electrolyte film, and an air electrode which is bonded to the other surface of the electrolyte film forming in total an electrolyte-electrode assembly, wherein the fuel electrode substrate is characterized by comprising a cermet of a first catalyst and a second solid electrolyte which shows oxide ion conductivity and has a bending strength of 500 MPa or more.

The present invention employs a cermet comprised of the first catalyst and the second solid electrolyte possessing a high mechanical strength as the fuel electrode substrate for an SOFC having a supported electrolyte film. Therefore, it effects the fuel cell less likely to crack leading to improved reliability. Also the fuel electrode substrate can be made thinner to improve the output density per unit volume.

In addition, when scandia-stabilized zirconia containing 9 to 12 mol % scandia ($Sc_2O_3$) is used for the first solid electrolyte constituting an electrolyte film, the specific resistance of the electrolyte film itself is decreased so that the power output of an SOFC having a supported electrolyte film is further improved.

Furthermore, installation of an intermediate cermet layer comprising the second catalyst and the third solid electrolyte possessing high oxide ion conductivity at low temperatures between the electrolyte film and the fuel electrode substrate causes reduction in the interfacial resistance between the electrolyte film and the fuel electrode substrate, effecting further improvement in the power generation performance of the SOFC.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
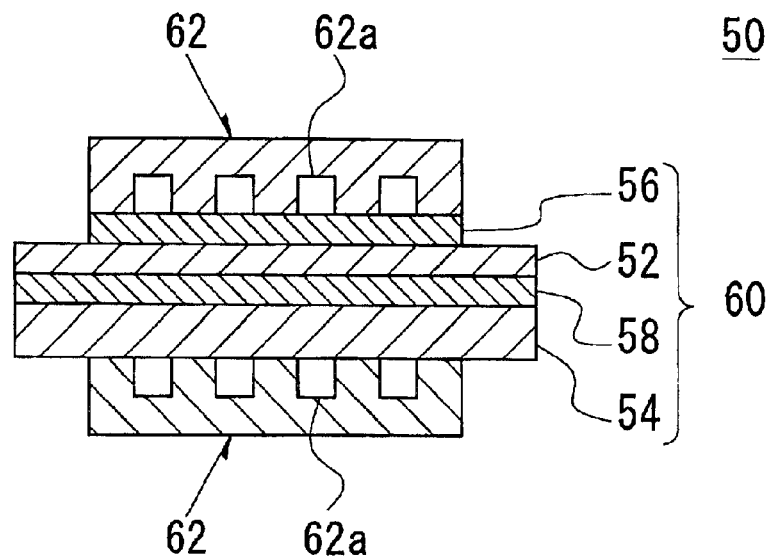
FIG. 1 is a schematic block diagram for an SOFC having a supported electrolyte film relating to the preferred embodiments of the present invention.

A detailed description of one preferred embodiment of an SOFC having a supported electrolyte film embodying the present invention will now be given referring to the accompanying drawings. In FIG. 1 is shown a section view of an SOFC having a supported electrolyte film relating to the preferred embodiments of the present invention. In the figure, an SOFC 50 having a supported electrolyte film has a structure in which an electrolyte-electrode assembly 60 is interposed between two gas separators 62, 62. The electrolyte-electrode assembly 60 is equipped with an electrolyte film 52, a fuel electrode substrate 54, an air electrode 56, and an interlayer 58.

In the beginning, an explanation is given on the electrolyte film 52. The electrolyte film 52 is comprised of a first solid electrolyte, which shows oxide ion conductivity. Many materials have been known as a solid electrolyte showing oxide ion conductivity. In the present invention, however, any of known solid electrolytes can be used for the electrolyte film 52. It is understood that the scope of the present invention is not to be limited except as otherwise set forth in the claims.

For the first solid electrolyte employed in the electrolyte film 52, the following substances are cited particularly as preferred embodiments: YSZ with 8 to 10 mol % yttria ($Y_2O_3$) added as a stabilizer, calcia-stabilized zirconia (CSZ) with 9 to 12 mol % calcia (CaO) added as a stabilizer, scandia-stabilized zirconia (SCSZ) with 9 to 12 mol % scandia ($Sc_2O_3$) added as a stabilizer. Among them, ScSZ possesses higher oxide ion conductivity than other materials, hence is particularly suitable for the first solid electrolyte.

When ScSZ is used as the first solid electrolyte 1, its scandia content in ScSZ is preferably 9 to 12 mol %. A scandia content of less than 9 mol % leads to declined oxide ion conductivity in the electrolyte film 52, and is not preferred. A scandia content of more than 12 mol % also leads to declined oxide ion conductivity in the electrolyte film 52, and is not preferred. The scandia content in ScSZ is, more preferably, 10 to 11 mol %.

For the first solid electrolyte, ScSZ with scandia only dissolved in solid phase may be used, or of trace amounts of yttria ($Y_2O_3$) or ceria ($CeO_2$) may be further added. In the case of further addition of yttria to ScSZ, the content is preferably below 2 mol %. An yttria content exceeding 2 mol % lowers the oxide ion conductivity of the electrolyte film 52, and is not preferred. The yttria content in ScSZ is, more preferably, 0.5 to 1 mol %.

In the addition of ceria further to ScSZ, the content is preferably below 2 mol %. A ceria content exceeding 2 mol % lowers the oxide ion conductivity of the electrolyte film 52, and is not preferred. The ceria content in ScSZ is, more preferably, 0.5 to 1 mol %.

It is preferable that the first solid electrolyte is a composite material of ScSZ with alumina ($Al_2O_3$). In the composite material of ScSZ with alumina, the alumina content is preferably below 2 wt % of ScSZ. An alumina content exceeding 2 wt % lowers the oxide ion conductivity of the electrolyte film 52, and is not preferred. The alumina content in ScSZ is, more preferably, 0.5 to 1 wt. %.

Further, it is preferable that the first solid electrolyte is made by dissolving one species selected from yttria and ceria or the both into ScSZ in solid phase. It is also preferred that the first solid electrolyte is made by a composite material of alumina with ScSZ, which has been prepared by dissolving one species selected from yttria and ceria or the both into ScSZ in solid phase.

The thickness of the electrolyte film 52 is determined depending on the material property of the electrolyte film 52 and the combination of the fuel electrode substrate 54, the air electrode 56, and the interlayer 58, which are to be described later, so that the prescribed oxide ion conductivity and the sufficient gastight property are retained at operating temperatures of the SOFC 50 having a supported electrolyte film. The thickness of the electrolyte film 52 is usually in a range of 10 to 20 μm.

Then an explanation is given on the fuel electrode substrate 54. The fuel electrode substrate 54 is to support the electrolyte film 52. In the SOFC 50 having a supported electrolyte film relating to the preferred embodiments of the present invention, a cermet comprising the first catalyst and a second solid electrolyte which shows oxide ion conductivity is employed for the purpose.

In the above case, catalysts having high activities toward fuel gas are employed as the first catalyst which constitutes a part of the fuel electrode substrate 54. More particularly, preferred embodiments for these catalysts include nickel (Ni), cobalt (Co), and ruthenium (Ru). It is understood that the scope of the preferred first catalyst is selected from any of the listed catalysts, and not to be limited in any manner. The content of the first catalyst in the fuel electrode substrate is determined depending on the species of the first catalyst and the operating conditions of the SOFC 50 having a supported electrolyte film so that the triple phase boundary is retained at operating temperatures of the SOFC 50 having a supported electrolyte film, and necessary characteristics for the prescribed electric conductivity and coefficients of thermal expansion comparable to those of the electrolytes are obtainable.

Concerning the second solid electrolyte constituting another part of the fuel electrode substrate 54, a material possessing sufficiently high mechanical strength is to be selected. More particularly, a material possessing a bending strength exceeding 500 MPa is preferred as the second solid electrolyte. Here, the bending strength is defined by the measured value on sintered materials which comprise the second solid electrolyte only, and have relative densities of more than 95%. In order to obtain the SOFC 50 having a supported electrolyte film with high reliability, the second solid electrolyte is particularly preferred to possess a bending strength of more than 1,000 MPa.

With regard to preferred embodiments for the second solid electrolyte that satisfy such conditions, preferably cited is scandia-stabilized zirconia containing 3 to 6 mol % scandia ($Sc_2O_3$). A scandia content of less than 3 mol % leads to declined oxide ion conductivity in the fuel electrode substrate 54, and is not preferred. On the other hand, a scandia content of more than 6 mol % leads to diminished bending strength of the fuel electrode substrate 54, and is not preferred, either.

With regard to other preferred embodiments for the second solid electrolyte, preferably cited is yttria-stabilized zirconia containing 2 to 4 mol % yttria ($Y_2O_3$). An yttria content of less than 2 mol % leads to decreased oxide ion conductivity in the fuel electrode substrate 54, and is not preferred. On the other hand, a yttria content of more than 4 mol % leads to diminished bending strength of the fuel electrode substrate 54, and is not preferred, either.

Then an explanation is given on the air electrode 56. The air electrode 56 is a film-formed electrode which is bonded to the remaining surface of the electrolyte film 52. It is composed of materials that are chemically stable in general at very high temperatures under oxygen atmosphere, and possess high electric conductivity. With regard to preferred embodiments for such materials, particularly cited are noble metals such as platinum, complex metal oxides such as $LaSrMnO_3$, $LaCaMnO_3$, $LaMgMnO_3$, $LaSrCoO_3$, and $LaCaCoO_3$.

In the present invention any of the above-cited materials may be used for the air electrode 56 and is not limited in any manner. Also the air electrode 56 may include the aforementioned materials exclusively, or it may be composite materials of the aforementioned materials and oxide ion-conductive solid electrolytes such as YSZ.

Next an explanation is given on the interlayer 58. The interlayer 58 is comprised of a cermet of the second catalyst and the third solid electrolyte which shows oxide ion conductivity. Here, concerning the second catalyst which constitutes a part of the interlayer 58, those that show excellent activity toward fuel gas are employed. With regard to preferred embodiments for such materials, particularly listed are nickel (Ni), cobalt (Co), and ruthenium (Ru). It is understood that the scope of the preferred second catalyst is selected from any of the listed catalysts, and not to be limited in any manner.

The content of the second catalyst in the interlayer 58 is determined depending on employed species of the second catalyst and operating conditions of the SOFC 50 having a supported electrolyte film, so that the triple phase boundary is maintained at operating temperatures of the SOFC 50 having a supported electrolyte film and necessary characteristics for prescribed electric conductivity and coefficients of thermal expansion comparable to those of the electrolytes are obtainable. Further, in selecting the second catalyst contained in the interlayer 58, it may be the same as the first catalyst contained in the fuel electrode substrate 54 or a different material.

With regard to the third solid electrolyte which constitutes another part of the interlayer 58, materials showing high oxide ion conductivity are to be employed. More particularly, a material showing oxide ion conductivity exceeding 0.1 S/cm at 800° C. is preferred. Preferred embodiments of the third solid electrolyte include ScSZ containing 9 to 12 mol % scandia ($Sc_2O_3$). A scandia content of less than 9 mol % leads to diminished oxide ion conductivity in the interlayer 58, and is not preferred. On the other hand, a scandia content of more than 12 mol % leads to diminished oxide ion conductivity in the interlayer 58, and is not preferred, either. The scandia content of ScSz is more preferably 10 to 11 mol %.

Concerning ScSZ used for the third solid electrolyte, it may be a solid solution with scandia only, or it may be further added of trace amounts of yttria ($Y_2O_3$), ceria ($CeO_2$), or alumina ($Al_2O_3$) similar to the case of ScSZ used as the first solid electrolyte. Similarity continues in the case of further addition of yttria and ceria to ScSZ preferably in less than 2 mol %, and in the composite material with alumina preferably in less than 2 wt %. Further, the third solid electrolyte used in the interlayer 58 may be the same as the first solid electrolyte used for the electrolyte film 52, or it may be a different material.

An explanation is given then on the gas separator 62. The gas separator 62 is a device for supplying fuel gas to the fuel electrode substrate 54, and oxidant gas to the air electrode 56 respectively. For the purpose, each gas separator 62 is equipped with a gas flow path 62a for supplying reacting gas. Also the gas separator 62 works as collecting equipment of electric current generated at the electrolyte-electrode assembly 60. Therefore, materials that satisfy conditions such as stability at operating temperatures, high electric conductivity, and gastight property (for example, Lanthanum-cromite-based oxides) are employed for the gas separator 62.

Figure 2:
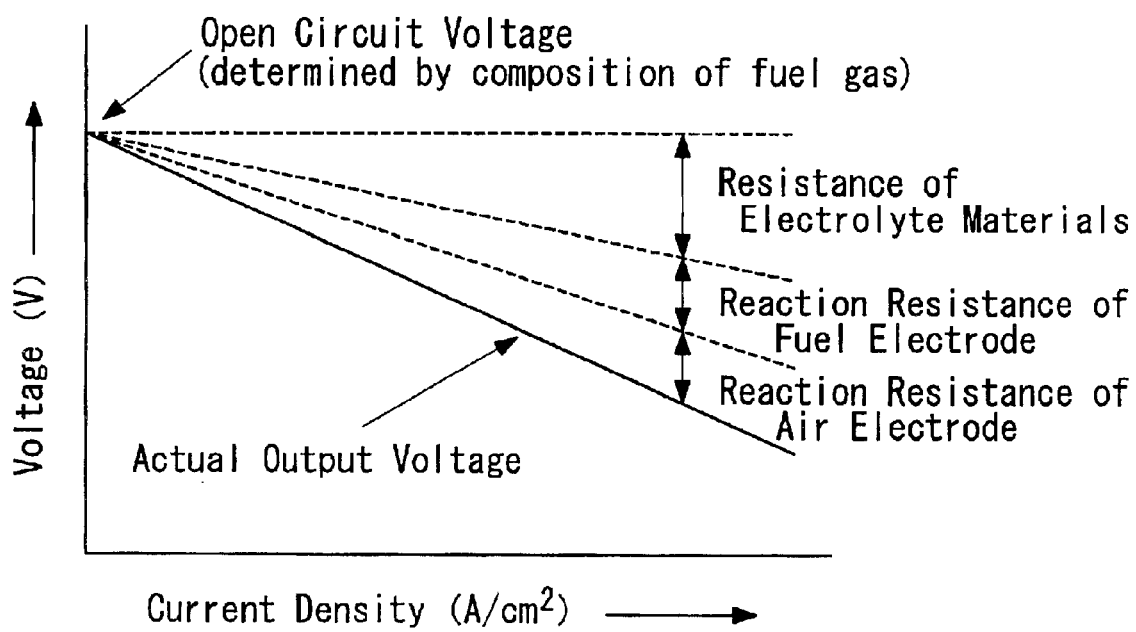
FIG. 2 is a typical graph for a general relation between open circuit voltage of an SOFC and actual output voltage.

Next comes an explanation on the performance of the SOFC 50 having a supported electrolyte film relating to the preferred embodiments of the present invention. FIG. 2 illustrates a typical graph for a general relation between open circuit voltage of SOFC and actual output voltage. The open circuit voltage of SOFC is generally determined by composition of fuel gas, which is fed into the fuel electrode. The difference between the open circuit voltage and the output voltage, which is actually obtained at feeding electric current into an SOFC, or the amplitude of overvoltage is determined by the resistance of electrolyte materials, reaction resistance of a fuel electrode, and reaction resistance of an air electrode as is shown in FIG. 2. In order to improve the output of an SOFC, it is necessary to decrease the overvoltage.

On the other hand, decrease in the operating temperature for an SOFC induces lowered oxide ion conductivity in electrolyte materials or raises the resistance of them resulting in its increased ratio in the overvoltage. In the conventional SOFC having a supported electrolyte film, reduction of resistance for electrolyte materials in total is accomplished by thinning electrolyte into film and supporting the electrolyte film with a fuel electrode substrate.

However, it was a generalized method for the conventional SOFC having a supported electrolyte film to employ a Ni-8YSZ cermet as the fuel electrode substrate. 8YSZ has a relatively high oxide ion conductivity. But its bending strength is limited to about 300 MPa indicating that it is weak for the required material strength. Thus it frequently causes cracks in the cell to result in inferior reliability when it is used as the material for a fuel electrode substrate. On the other hand, thickening the fuel electrode substrate for avoiding this problem leads to inferior gas permeability of the fuel electrode substrate. This is materialized in the reacting resistance in the fuel electrode inducing lowered outputs.

The SOFC 50 having a supported electrolyte film relating to the preferred embodiments of the present invention, on the contrary, employs the second solid electrolyte having a sufficiently high mechanical strength such as YSZ containing 2 to 4 mol % yttria as a solid solution or ScSZ containing 3 to 6 mol % scandia as a solid solution as the materials constituting the fuel electrode substrate 54. For this reason, the mechanical strength for the fuel electrode substrate 54 is improved. Therefore, it brings about hardly cracking cells and eventually improved reliability for SOFC having a supported electrolyte film (50).

It is also possible to make the fuel electrode substrate 54 thin without sacrificing the reliability owing to increased mechanical strength in the substrate. For example, it was customary to keep the thickness of Ni-8YSZ to about 1 mm for avoiding cracks in the cell when the material is employed in a fuel electrode substrate. According to the present invention, it is possible to make the fuel electrode substrate 54 as thin as 0.3 mm. The thinning increases gas permeability of the fuel electrode substrate 54 results in improved power generation outputs for the SOFC 50 having a supported electrolyte film. Likewise the total thickness of the cell stack, which is made by laminating multiple numbers of the SOFC 50 having a supported electrolyte film, is reduced improving output power densities per unit volume. Further, a necessary amount of materials is diminished reducing material costs for the SOFC 50.

In the conventional SOFC having a supported electrolyte film, 8YSZ has been usually used for the electrolyte film. Since the oxide ion conductivity of electrolytes at operating temperatures of an SOFC, which acts at low temperatures, is almost determined by composition of used materials, it becomes necessary to make the electrolyte film much thinner in order to decrease its resistance, yet continuing the use of 8YSZ as the material for an electrolyte. However, too thin an electrolyte film yields a difficulty in retaining its gastight property. Therefore, there are certain limits in the improvement of power outputs depending on thinning the electrolyte.

On the contrary, use of solid electrolytes having high oxide ion conductivity such as ScSZ, in which a prescribed amount of scandia is dissolved in solid solution instead of conventional 8YSZ, causes reduction in the specific resistance of the electrolyte film itself. For this reason, higher outputs can be accomplished with the same thickness of electrolyte film as before.

Further, in the conventional SOFC having a supported electrolyte film, the electrolyte-electrode assembly is comprised of a three-layered structure comprising a fuel electrode substrate, an electrolyte film, and an air electrode. In an SOFC having a supported electrolyte film, which is equipped with such an electrolyte-electrode assembly, use of a highly strong material for the solid electrolyte constituting the fuel electrode substrate leads to increased interfacial resistance between the electrolyte film and the fuel electrode substrate, and resultantly increases overvoltage.

To the contrary, as for the SOFC 50 having a supported electrolyte film consistent with the preferred embodiments of the present invention, the interlayer 58 containing the highly oxide ion-conductive third solid electrolyte is sandwiched between the fuel electrode substrate 54 and the electrolyte film 52, so that the electrolyte-electrode assembly 60 has a four-layered structure, whereby enabling the interfacial resistance between the electrolyte film 52 and the fuel electrode substrate 54 to be lowered. For this reason, increase in the overvoltage derived from interfacial resistance is suppressed and the performance of the SOFC 50 having a supported electrolyte film is further improved.

Then an explanation is given on the SOFC 50 having a supported electrolyte film relating to the preferred embodiments of the present invention. The SOFC 50 having a supported electrolyte film relating to the preferred embodiments of the present invention may be prepared by the following procedure. That is, the first catalyst and the second solid electrolyte are mixed first in a prescribed ratio and molded into a sheet. For the molding method, any method can be used including press molding method, doctor blade method, etc. and it is not limited in any manner. Then the obtained molded sheet is sintered to form the fuel electrode substrate 54.

Next the slurry containing the second catalyst and the third solid electrolyte is applied on the fuel electrode substrate 54 followed by sintering to yield the interlayer 58. Then it is applied of the slurry containing the first solid electrolyte followed by sintering to form the electrolyte film 52. Furthermore, the slurry containing materials for air electrode is applied on the surface of the electrolyte film 52 followed by sintering to form the air electrode 56. The obtained electrolyte-electrode assembly 60 is interposed between the gas separators 62, 62 yielding the SOFC 50 having a supported electrolyte film, which is equipped with a structure shown in FIG. 1.

By the way, for the painting method of the interlayer 58, the electrolyte film 52, and the air electrode 56, various techniques may be used including screen printing, painting with brush, spraying, or dipping, and the method is not limited in any manner at all. In the above-explained example, a sintering method is individually adopted for the fuel electrode substrate 54, the interlayer 58, the electrolyte film 52, and the air electrode 56. In the case the most suitable temperatures are close for respective layer, simultaneous sintering of two adjacent layers or more is allowable.

EXAMPLES

Example 1

An SOFC having a supported electrolyte film was produced by the following procedure: first, powdered nickel oxide and a powder having a composition of $ZrO_2$-3 mol % $Y_2O_3$ (referred to as 3YSZ hereinafter) were weighed in a ratio of Ni:3YSZ=4:6, mixed in a ball mill for 24 hours, and dried. The obtained powder was molded into a sheet by the doctor blade method followed by sintering at 1,000° C. to yield a fuel electrode substrate. The obtained fuel electrode substrate was about 0.3 mm thick.

Next, powdered nickel oxide and a powder having a composition of ($ZrO_2$-11 mol % $Sc_2O_3$) 99 wt %—$Al_2O_3$ 1 wt % (referred to as 11S1A hereinafter) were weighed in a ratio of Ni:11S1A=4:6, mixed in a ball mill for 24 hours, and dried. Then a binder was added into the mixed powder to form slurry. The slurry was applied on the surface of a fuel electrode substrate by the screen printing method to yield an interlayer, and the product was sintered at 1,300° C.

Next a binder was added into a powder of 11S1A to form slurry. The slurry was applied on the surface of an interlayer by the dipping method to yield an electrolyte film, and the product was sintered at 1,450° C.

Next a powder of $La_{0.8}Sr_{0.2}MnO_3$ (referred to as LSM hereinafter) and a powder of 8YSZ were weighed in a ratio of LSM:8YSZ=8:2, mixed in a ball mill for 24 hours, and dried. Then a binder was added into the obtained material for an air electrode. The formed slurry was applied on the surface of an electrolyte film by the screen printing method to yield an air electrode, and the product was sintered at 1,150° C. Furthermore, the obtained electrolyte-electrode assembly comprised of four-layered structure was interposed between two gas separators to give an SOFC having a supported electrolyte film.

Comparative Example 1

An SOFC having a supported electrolyte film was produced by the following procedure: First powdered nickel oxide and a powder having a composition of 8YSZ were weighed in a ratio of Ni:8YSZ=4:6, mixed in a ball mill for 24 hours, and dried. The obtained powder was molded into a sheet by the doctor blade method followed by sintering at 1,000° C. to yield a fuel electrode substrate. The obtained fuel electrode substrate was about 1 mm thick.

Then a binder was added into the powder of 11S1A to form slurry. The slurry was applied on the surface of a fuel electrode substrate by the dipping method to yield an electrolyte film, and the product was sintered at 1,450° C.

Next, a powder of LSM and a powder of 8YSZ were weighed in a ratio of LSM:8YSZ=8:2, mixed in a ball mill for 24 hours, and dried. Then a binder was added into the obtained material for an air electrode. The formed slurry was applied on the surface of an electrolyte film by the screen printing method to yield an air electrode, and the product was sintered at 1,150° C. Furthermore, the obtained electrolyte-electrode assembly comprised of a three-layered structure was interposed between two gas separators to give an SOFC having a supported electrolyte film.

Power generation experiments were carried out on the two species of SOFC having a supported electrolyte film obtained in Example 1 and Comparative Example 1. The temperature for power generation was set at 750° C., and hydrogen was employed as the fuel gas. Oxygen or the air was adopted as the oxidant gas.

Figure 3:
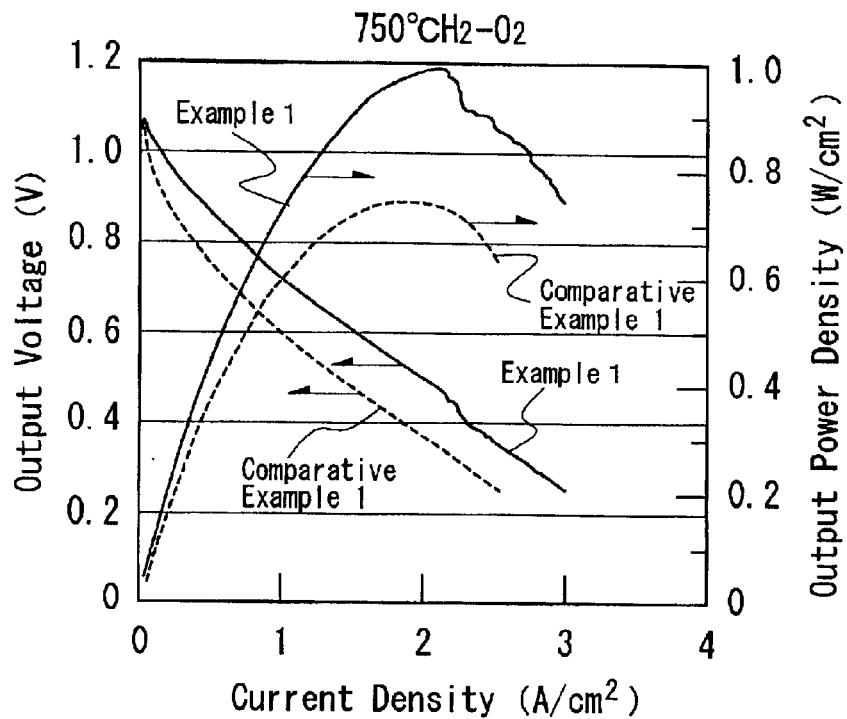
FIG. 3 is a graph illustrating the dependence of output voltage and the output power density on the current density of the SOFC having a supported electrolyte film when hydrogen is used as a fuel gas and oxygen is used as an oxidant gas.

FIG. 3 illustrates the dependence of output voltage and the output power density on the current density when hydrogen is fed into the fuel electrode and oxygen is fed into the air electrode. Comparing output voltage figures under conditions of the same current density, it is clear that the SOFC having a supported electrolyte film in Example 1 exhibits larger output voltage than the SOFC having a supported electrolyte film in Comparative Example 1. While the maximum output power density was about 0.7 W/cm$^2$ in Comparative Example 1, the value for Example 1 was improved to about 1.0 W/cm$^2$.

Figure 4:
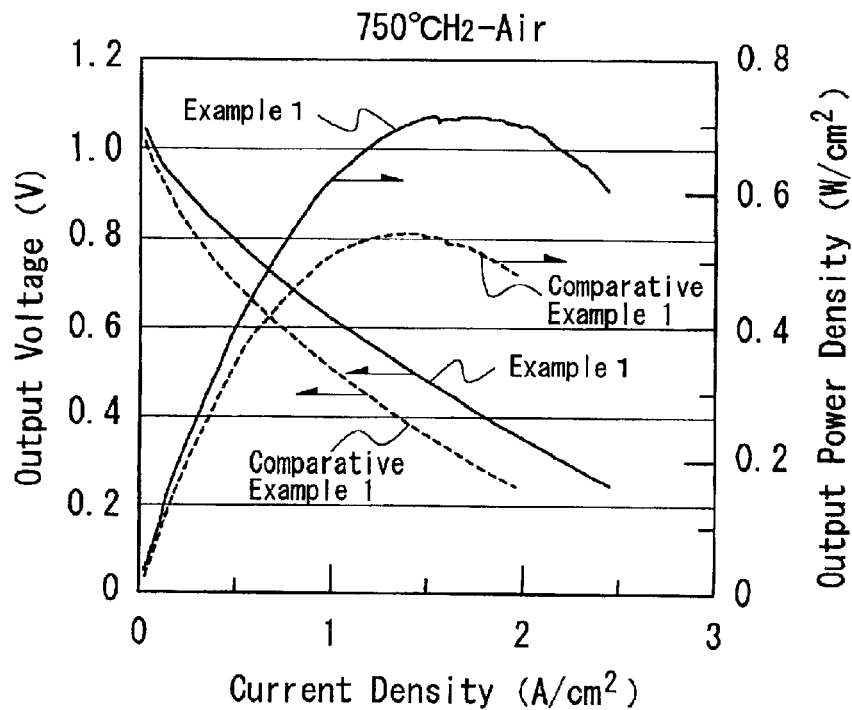
FIG. 4 is a graph illustrating the dependence of output voltage and the output power density on the current density of the SOFC having a supported electrolyte film when hydrogen is used as a fuel gas and the air is used as an oxidant gas.
Figure 5A:
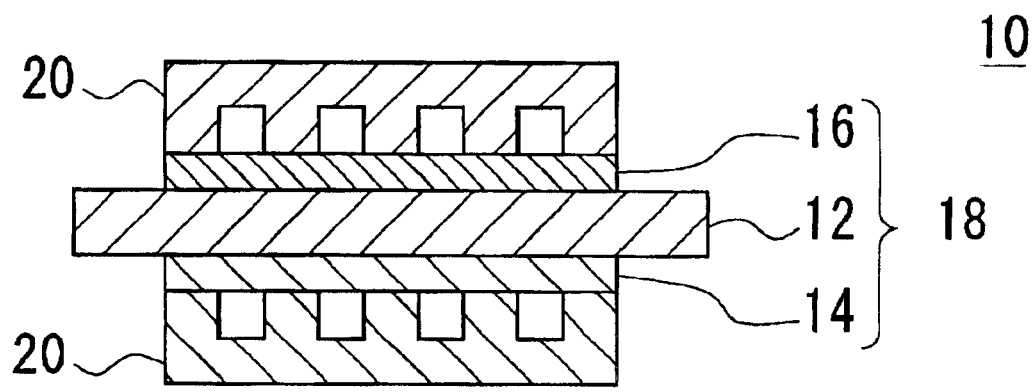
FIG. 5A is a schematic block diagram for an SOFC having a self-supporting electrolyte film.
Figure 5B:
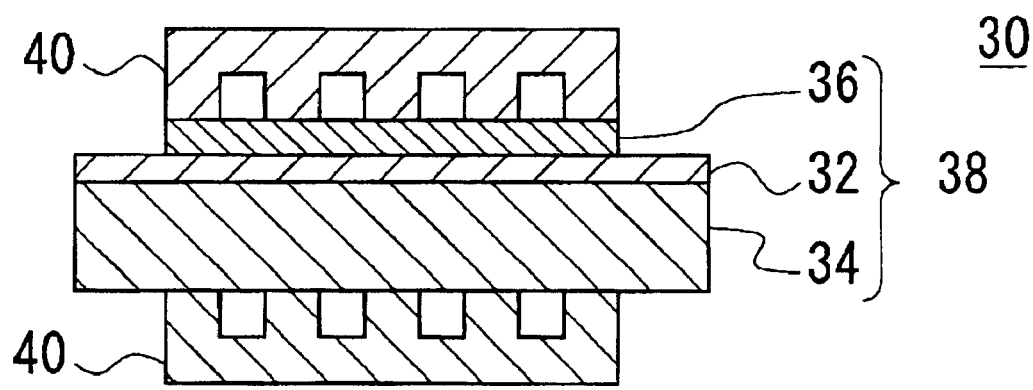
FIG. 5B is a schematic block diagram for an SOFC having a supported electrolyte film.

FIG. 4 illustrates the dependence of output voltage and the output power density on the current density when hydrogen is fed into the fuel electrode and the air is fed into the air electrode. It is similarly clear in the comparison under conditions of the same current density as in FIG. 4 that the SOFC in Example 1 exhibits larger output voltage than the SOFC in Comparative Example 1. While the maximum output power density was about 0.53 W/cm$^2$ in Comparative Example 1, the value for Example 1 was improved to about 0.7 W/cm$^2$.

The both species of SOFC having a supported electrolyte film obtained in Example 1 and Comparative Example 1 exhibited maximum output power density figures higher than the conventional SOFC having a supported electrolyte film using 8YSZ as the electrolyte film. This is because ScSZ, which shows higher oxide ion conductivity than 8YSZ, is employed in them as the electrolyte film.

As is shown above, the SOFC having a supported electrolyte film in Example 1 exhibits a higher maximum output power density than the SOFC having a supported electrolyte film in Comparative Example 1. This is because 3YSZ, which has a mechanical strength higher than 8YSZ, is employed as a constituting material for the fuel electrode substrate in Example 1. This makes the fuel electrode substrate thinner to result in the improvement of gas permeability for the fuel electrode substrate. In the case of Example 1, an interlayer is interposed between the electrolyte film and the fuel electrode substrate. This works to improve activity of the SOFC toward fuel gas and reduce the interfacial resistance between the electrolyte film and the fuel electrode substrate resulting in the higher maximum output power density.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A solid oxide fuel cell having a supported electrolyte film comprising:

an electrolyte film comprised of a first solid electrolyte exhibiting oxide ion conductivity;

a fuel electrode acting as a substrate which is bonded to a surface of the electrolyte film, and an air electrode which is bonded to the other surface of the electrolyte film forming in total an electrolyte-electrode assembly, wherein the fuel electrode acting as a substrate comprises a cermet of a first catalyst and a second solid electrolyte which shows oxide ion conductivity and has a bending strength of 500 MPa or more, and the fuel electrode acting as a substrate has a thickness greater than a thickness of the electrolyte film.

2. A solid oxide fuel cell having a supported electrolyte film according to claim 1, wherein the second solid electrolyte is comprised of yttria-stabilized zirconia containing 2 to 4 mol % yttria ($Y_2O_3$).

3. A solid oxide fuel cell having a supported electrolyte film according to claim 2, wherein the first solid electrolyte is comprised of scandia-stabilized zirconia containing 9 to 12 mol % scandia ($Sc_2O_3$).

4. A solid oxide fuel cell having a supported electrolyte film according to claim 3, wherein an interlayer cermet film comprising a second catalyst and a third electrolyte which shows oxide ion conductivity exceeding 0.1 S/cm at 800° C. is interposed between the electrolyte film and the fuel electrode substrate.

5. A solid oxide fuel cell having a supported electrolyte film according to claim 4, wherein the third solid electrolyte is comprised of Scandia-stabilized zirconia containing 9 to 12 mol % scandia ($Sc_2O_3$).

6. A solid oxide fuel cell having a supported electrolyte film according to claim 2, wherein an interlayer cermet film comprising a second catalyst and a third electrolyte which shows oxide ion conductivity exceeding 0.1 S/cm at 800° C. is interposed between the electrolyte film and the fuel electrode substrate.

7. A solid oxide fuel cell having a supported electrolyte film according to claim 6, wherein the third solid electrolyte is comprised of scandia-stabilized zirconia containing 9 to 12 mol % scandia ($Sc_2O_3$).

8. A solid oxide fuel cell having a supported electrolyte film according to claim 1, wherein the second solid electrolyte is comprised of scandia-stabilized zirconia containing 3 to 6 mol % scandia ($Sc_2O_3$).

9. A solid oxide fuel cell having a supported electrolyte film according to claim 8, wherein the first solid electrolyte is comprised of scandia-stabilized zirconia containing 9 to 12 mol % scandia ($Sc_2O_3$).

10. A solid oxide fuel cell having a supported electrolyte film according to claim 9, wherein an interlayer cermet film comprising a second catalyst and a third electrolyte which shows oxide ion conductivity exceeding 0.1 s/cm at 800° C. is interposed between the electrolyte film and the fuel electrode substrate.

11. A solid oxide fuel cell having a supported electrolyte film according to claim 10, wherein the third solid electrolyte is comprised of scandia-stabilized zirconia containing 9 to 12 mol % scandia ($Sc_2O_3$).

12. A solid oxide fuel cell having a supported electrolyte film according to claim 8, wherein an interlayer cermet film comprising a second catalyst and a third electrolyte which shows oxide ion conductivity exceeding 0.1 S/cm at 800° C. is interposed between the electrolyte film and the fuel electrode substrate.

13. A solid oxide fuel cell having a supported electrolyte film according to claim 12, wherein the third solid electrolyte is comprised of scandia-stabilized zirconia containing 9 to 12 mol % scandia ($Sc_2O_3$).

* * * * *